(12) United States Patent
Linde et al.

(10) Patent No.: US 11,697,487 B2
(45) Date of Patent: Jul. 11, 2023

(54) FUSELAGE STRUCTURE FOR AN AIRCRAFT

(71) Applicant: Airbus Operations GmbH, Hamburg (DE)

(72) Inventors: Peter Linde, Hamburg (DE); Norbert Heltsch, Hamburg (DE)

(73) Assignee: Airbus Operations GmbH

( * ) Notice: Subject to any disclaimer, the term of this patent is extended or adjusted under 35 U.S.C. 154(b) by 1099 days.

(21) Appl. No.: 16/406,370

(22) Filed: May 8, 2019

(65) Prior Publication Data

US 2019/0351990 A1  Nov. 21, 2019

(30) Foreign Application Priority Data

May 17, 2018  (DE) .................... 10 2018 207 763.0

(51) Int. Cl.
*B64C 1/06* (2006.01)
*B64C 1/00* (2006.01)
*B64C 1/40* (2006.01)

(52) U.S. Cl.
CPC .............. *B64C 1/068* (2013.01); *B64C 1/064* (2013.01); *B64C 1/406* (2013.01); *B64C 2001/0072* (2013.01)

(58) Field of Classification Search
CPC ......... B64C 1/068; B64C 1/061; B64C 1/064; B64C 1/00
See application file for complete search history.

(56) References Cited

U.S. PATENT DOCUMENTS

| 6,958,105 | B2 * | 10/2005 | Herrmann | B29C 70/443 |
| | | | | 156/245 |
| 7,025,305 | B2 | 4/2006 | Folkesson et al. | |
| 8,262,024 | B2 * | 9/2012 | Marquez | B64C 1/064 |
| | | | | 244/119 |
| 8,834,667 | B2 * | 9/2014 | McCarville | B29C 66/1122 |
| | | | | 156/304.6 |
| 8,876,048 | B2 * | 11/2014 | Herrmann | B64C 1/067 |
| | | | | 244/119 |

(Continued)

FOREIGN PATENT DOCUMENTS

DE       2315030 A1 * 10/1973
DE  10 2013 021 066 A1    6/2015
(Continued)

*Primary Examiner* — Magdalena Topolski
(74) *Attorney, Agent, or Firm* — Lerner David LLP

(57) ABSTRACT

A fuselage structure for an aircraft has a frame structure, which extends in a circumferential direction and has a first connecting section and a second connecting section, which is arranged spaced apart from the first connecting section, a reinforcing structure, which extends between the first and the second connecting sections and is connected respectively to the first and the second connecting sections, an outer shell, which is secured on an outer side of the reinforcing structure, and an inner shell, which is secured on an inner side of the reinforcing structure. The reinforcing structure has a profiled cross section when viewed in a longitudinal direction extending transversely to the circumferential direction and, together with the inner shell and the outer shell, forms a plurality of channels, which are adjacent to one another in the circumferential direction and each extend in the longitudinal direction.

15 Claims, 4 Drawing Sheets

(56) References Cited

U.S. PATENT DOCUMENTS

| | | | |
|---|---|---|---|
| 8,967,540 B2 * | 3/2015 | Lacombe | B64C 1/061 244/119 |
| 11,383,817 B2 * | 7/2022 | Grip | B64C 1/068 |
| 2015/0328845 A1 | 11/2015 | Lockett et al. | |
| 2016/0129985 A1 * | 5/2016 | Mohanty | B64C 1/064 244/119 |
| 2016/0339668 A1 | 11/2016 | Abe et al. | |
| 2016/0368586 A1 | 12/2016 | Weimer et al. | |
| 2016/0375978 A1 * | 12/2016 | Joern | B29B 11/06 244/120 |
| 2021/0031897 A1 * | 2/2021 | Haack | B64C 1/061 |

FOREIGN PATENT DOCUMENTS

| | | | | | |
|---|---|---|---|---|---|
| EP | 0665097 | A2 * | 8/1995 | | |
| EP | 2 985 232 | A1 | 2/2016 | | |
| FR | 797149 | A * | 4/1936 | | |
| GB | 428225 | A * | 5/1935 | | |
| JP | H04117747 | A | 4/1992 | | |
| JP | H07-16968 | A | 1/1995 | | |
| WO | WO-2008025860 | A1 * | 3/2008 | | B29C 70/34 |
| WO | WO-2011000987 | A1 * | 1/2011 | | B64C 1/064 |

* cited by examiner

FUSELAGE STRUCTURE FOR AN AIRCRAFT

FIELD OF THE INVENTION

The present invention relates to a fuselage structure for an aircraft and to an aircraft.

BACKGROUND OF THE INVENTION

Fuselage structures for aircraft are generally assembled from longitudinal members extending in a longitudinal direction, referred to as "stringers", and annular circumferential members extending in a circumferential direction, referred to as "frames". Typically, an outer skin of the aircraft is secured on this base frame defining an interior of the aircraft. Cabin components, such as floors, cabin monuments and the like are arranged in the interior and connected to the fuselage structure.

Moreover, it is often necessary to accommodate functional components, such as air-conditioning systems and the associated pipes as well as electric and hydraulic supply lines, in the interior of the aircraft. In this context, there is a need to integrate these functional components into the interior in as space-saving a way as possible.

EP 2 985 232 A1 describes a fuselage structure having frames and stringers, which are lined with internal lining parts. An air-conditioning pipe extending in the longitudinal direction is arranged in a ceiling region and is integrated into the internal lining parts.

BRIEF SUMMARY OF THE INVENTION

Aspects of the present invention may provide an improved fuselage structure for an aircraft.

According to a first aspect of the invention, a fuselage structure for an aircraft is provided. The fuselage structure has a frame structure, which extends in a circumferential direction and has a first connecting section and a second connecting section, which is arranged spaced apart from the first connecting section along the circumferential direction. Thus, in particular, the frame structure can be designed as an annular support or frame, wherein said support or frame has an interruption or aperture between the first and the second connecting section.

The fuselage structure according to an embodiment of the invention furthermore has a reinforcing structure, which extends along the circumferential direction between the first and the second connecting section of the frame structure and is connected respectively to the first and the second connecting section. Thus, the reinforcing structure is inserted into the aperture in the frame structure or continues the frame structure, as a result of which the frame structure and the reinforcing structure jointly form a closed frame.

An outer shell, e.g. an outer skin segment, is secured on an outer side of the reinforcing structure, and an inner shell is secured on an inner side of the reinforcing structure, said inner side being situated opposite the outer side. Accordingly, the reinforcing structure is arranged between the inner shell and the outer shell in relation to a radial direction and is connected to said shells. The inner shell, the outer shell and the reinforcing structure consequently form a sandwich-type structure. The inner shell and the outer shell can also be referred to as an inner fuselage skin and an outer fuselage skin. By virtue of the direct securing of the inner and the outer shell on the reinforcing structure, the sandwich-type structure advantageously has a high mechanical strength.

According to an embodiment of the invention, the reinforcing structure has a profiled cross section when viewed in a longitudinal direction extending transversely to the circumferential direction and, together with the inner shell and the outer shell, forms a plurality of channels, which are adjacent to one another in the circumferential direction and each extend in the longitudinal direction. Thus, the reinforcing structure is, in particular, designed as a sheet-like component which extends both in the circumferential direction and in the longitudinal direction, transversely to the circumferential direction. A section through the reinforcing structure in the circumferential direction or transversely to the longitudinal direction results in a cross-sectional shape which forms raised portions and depressions or has an undulating shape when viewed in the longitudinal direction. These raised portions and depressions extending in the longitudinal direction, together with the inner shell and the outer shell, define channel cross sections of channels extending in the longitudinal direction.

The channels formed in this way can be used, in particular, as air-conditioning ducts or, more generally, to accommodate functional components. A multifunctional fuselage structure is thereby created. Since the reinforcing structure is arranged between the connecting sections of the frame structure, an extremely space-saving construction is obtained. In particular, the channels can be integrated directly into the fuselage structure itself and it is possible to eliminate mounting of the channels as additional components on the fuselage structure. By virtue of the sandwich-type construction with the reinforcing structure arranged between the inner and the outer shell, the mechanical strength of the fuselage structure is furthermore improved.

According to one embodiment of the fuselage structure, the reinforcing structure is profiled in such a way that said structure is connected alternately to the outer shell and the inner shell along the circumferential direction. Thus, along the circumferential direction, the reinforcing structure, which is preferably designed as a one-piece sheet-like layer of approximately constant thickness, can have a wave-like cross-sectional shape, e.g. in the form of a sine wave, a sawtooth wave, a triangular wave, a square wave or a trapeziform wave. In general, a periodic cross-sectional shape is advantageous. By this means and by means of the alternating connection to the inner and the outer shell, there is a further improvement in a bending stiffness and especially a shear stiffness of the fuselage structure in the circumferential direction. Moreover, stiffening of the outer and the inner shell to provide stability against buckling is achieved in this way.

As an option, the reinforcing structure, which can also be referred to as a reinforcing layer, alternately rests against or makes contact with the outer shell and the inner shell. This makes the construction even more compact and facilitates direct force transmission between the shells and the reinforcing structure.

According to one embodiment, it is envisaged that the outer shell, the inner shell and the reinforcing structure are each formed from a fibre composite material. Fibre composite materials offer the advantage that they have a high mechanical strength in relation to their weight. Moreover, fibre composite material offers the advantage that it is corrosion-resistant and fatigue-resistant, and it is therefore possible to dispense with a corresponding inspection. This is advantageous, in particular, because the channels formed in the interior of the fuselage structure by the reinforcing layer and the shells are accessible from the outside only with difficulty.

As an option, the outer shell, the inner shell and the reinforcing structure can each be formed from the same fibre composite material. This facilitates the production of the fuselage structure, in particular.

As a further option, the frame structure too can be formed from a fibre composite material, in particular the same fibre composite material as the reinforcing structure.

According to one embodiment of the fuselage structure, the outer shell and the inner shell are each connected materially and/or by means of fastening devices to the reinforcing structure. A material joint can be achieved by bonding the reinforcing structure adhesively to the shells, for example. It is also conceivable to weld the shells to the reinforcing structure. If the shells and the reinforcing structure are formed from a fibre composite material, this can be accomplished by means of an ultrasonic or thermal welding method, for example. As an alternative or in addition or in certain regions, a joint can also be achieved by means of fastening devices, e.g. rivets, bolts, screws, clips or the like.

According to another embodiment of the fuselage structure, it is envisaged that the reinforcing structure has a first fastening structure, which is connected to the first connecting section of the frame structure, and a second fastening structure, which is connected to the second connecting section of the frame structure. According to this embodiment, therefore, special connections to end sections of the reinforcing structure which are opposite one another in relation to the circumferential direction and are designed for connection to the connecting sections of the frame structure are provided.

It is possible, in particular, for the first fastening structure and/or the second fastening structure to be formed by a receiving recess, which is formed in a projection and in which the respective connecting section of the frame structure is accommodated. According to this, a jaw with a recess or groove, into which the respective connecting section is inserted, is provided on the reinforcing structure. The recess preferably has a cross-sectional shape of complementary design to the respective connecting section of the frame structure. Accommodating the connecting section in the recess advantageously makes it easier to position the reinforcing structure relative to the frame structure during assembly.

The first fastening structure and/or the second fastening structure can also be formed by a profiled support, which extends in the circumferential direction and is connected to the respective connecting section of the frame structure. In this case, the fastening structure is formed, for example, by a section of plate-shaped design which projects in the circumferential direction from the reinforcing structure.

As an option, the profiled support overlaps with the respective connecting section of the frame structure in the circumferential direction. By virtue of the overlap, there is, in particular, a further improvement in the torsional stiffness of the fuselage structure.

According to one embodiment, the connecting sections of the frame structure are each connected to the reinforcing structure materially and/or by means of fastening devices. A material joint can be achieved by adhesive bonding or welding, for example. As an alternative or in addition or in certain regions, a joint can also be achieved by means of fastening devices, e.g. rivets, bolts, screws, clips or the like.

According to another embodiment, it is envisaged that the outer shell has an insulating layer on an inner surface, which faces the reinforcing structure. The insulating layer can be formed from a mineral wool, for example. The thermal insulating effect achieved by means of the insulating layer is advantageous particularly for use of one or more of the channels as an air-conditioning duct since this reduces the outlay for lining the duct.

According to another embodiment, electric conductor tracks are formed on the inner surface of the outer shell, which faces the reinforcing structure, and/or on an inner surface of the inner shell, which faces the reinforcing structure. According to this, the electrically conductive material of the conductor tracks is applied directly to the respective shell, if appropriate to an electrically insulating region or to an insulating layer. This saves further space for cabling.

According to another embodiment, functional components, in particular supply lines, such as electric or hydraulic supply lines, are arranged in the channels.

According to another embodiment, the fuselage structure additionally has a further frame structure, which is spaced apart from the frame structure in the longitudinal direction and has a first connecting section and a second connecting section, which is arranged spaced apart from the first connecting section along the circumferential direction. The reinforcing structure extends along the circumferential direction between the first and the second connecting section of the further frame structure and is connected respectively to the first and the second connecting section of the further frame structure.

According to another aspect of the invention, an aircraft having a fuselage structure according to any one of the preceding embodiments described is provided. In particular, this can be a passenger aircraft. In this case, the outer shell of the fuselage structure preferably forms part of an outer skin of the aircraft.

Regarding direction indications and axes, especially direction indications and axes which relate to the shape of physical structures, the extent of an axis, a direction or a structure "along" another axis, direction or structure is taken to mean that these, in particular the tangents formed at a respective point on the structures, each extend at an angle of less than or equal to 45 degrees, preferably less than or equal to 30 degrees and, in particular, preferably parallel to one another.

Regarding direction indications and axes, especially direction indications and axes which relate to the shape of physical structures, the extent of an axis, a direction or a structure "transversely" to another axis, direction or structure is taken to mean that these, in particular the tangents formed at a respective point on the structures, each extend at an angle of greater than 45 degrees, preferably greater than 60 degrees and, in particular, preferably perpendicular to one another.

In this document, a "fibre material" or a "fibre composite material" is generally taken to mean a material which is formed from a multiplicity of reinforcing fibres, in particular fibres in the form of threads or pieces of thread, e.g. carbon, glass, ceramic, aramid, boron, mineral, natural or synthetic fibres or blends thereof. In particular, the fibre material can also be impregnated with a resin or matrix material, e.g. a thermosetting, thermoplastic, elastomeric resin or, more generally, a synthetic resin or the like.

BRIEF DESCRIPTION OF THE DRAWINGS

Aspects of the invention are explained below with reference to the figures of the drawings. Of the figures.

DETAILED DESCRIPTION

In the figures, the same reference signs denote identical or functionally identical components, unless stated otherwise.

Figure 1:
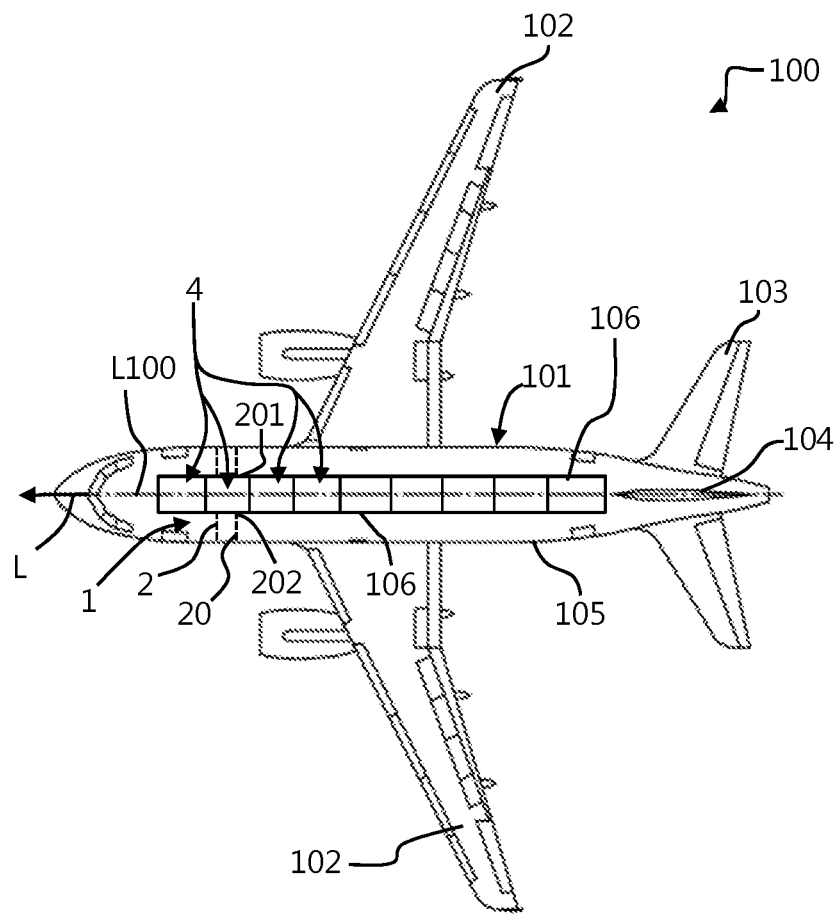
FIG. 1 shows a schematic view of an aircraft according to one illustrative embodiment of the present invention in a plan view.

FIG. 1 shows an aircraft 100 in a plan view. The aircraft has a fuselage 101 extending in a longitudinal direction L, wings 102, horizontal tail surfaces 103 and a tailplane 104. The fuselage 101 has a fuselage structure 1, illustrated only schematically in FIG. 1, having a plurality of frames 2, 20 and an outer skin 105. As furthermore illustrated in FIG. 1, a partial region of the outer skin 105 is formed by at least one outer shell 4 of the fuselage structure 1. FIG. 1 illustrates by way of example that a multiplicity of outer shells 4, which are arranged in series in the longitudinal direction L and form a partial region of the outer skin 105, is provided.

Figure 2:
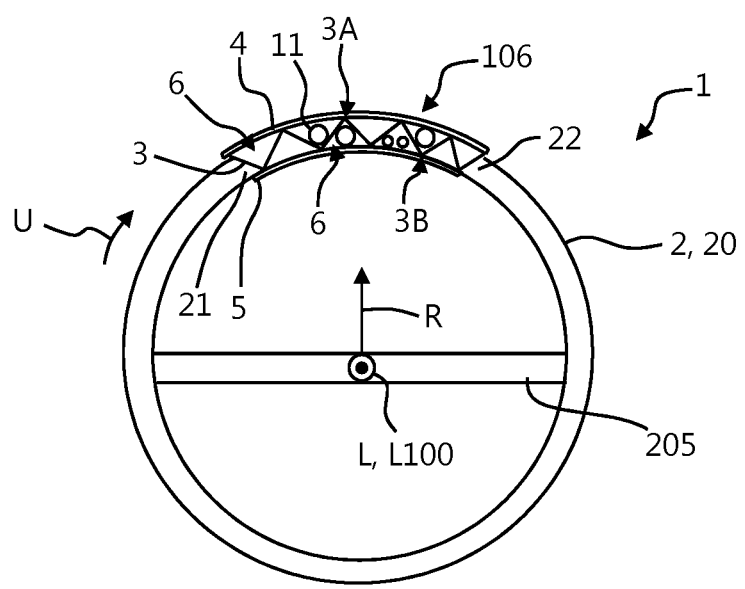
FIG. 2 shows a schematic section through a fuselage structure according to one illustrative embodiment of the present invention.
Figure 3:
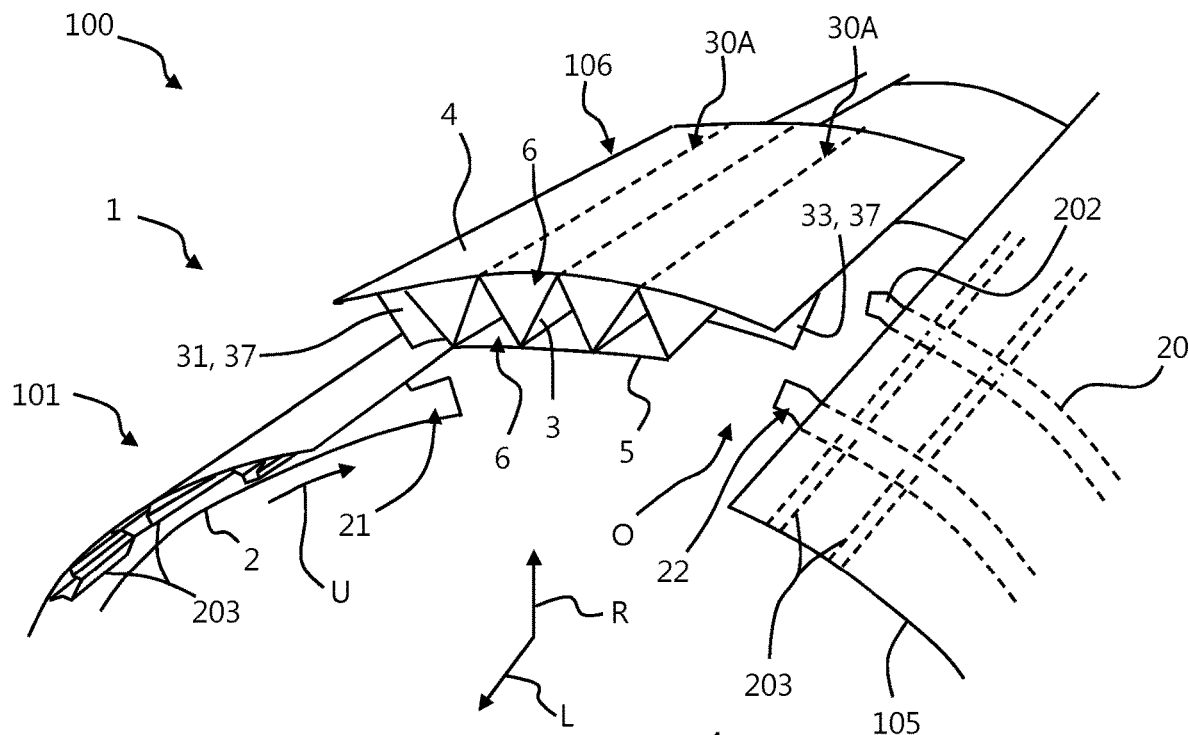
FIG. 3 shows a partial perspective view of an aircraft according to one illustrative embodiment of the present invention in a schematic exploded illustration.

FIG. 2 shows a schematic section through the fuselage structure 1 by way of example. FIG. 3 illustrates a perspective partial section through the fuselage 101 which has the fuselage structure 1. The fuselage structure 1 has a first frame structure 2, one or more optional second frame structures 20, a reinforcing structure or reinforcing layer 3, an outer shell 4 and an inner shell 5.

It is, in particular, the first frame structure 2 which is explained in greater detail below. However, the statements also apply equally to the optional further frame structures 20. As shown in FIG. 2, the first frame structure 2 and the optional second frame structure 20 are arranged spaced apart from one another in the longitudinal direction L. As illustrated by way of example particularly in FIG. 2, it is possible, in particular, for the frame structures 2, 20 to be designed as ring segments. In general, the frame structures 2, 20 extend in a circumferential direction U and thus at least partially surround a longitudinal axis L100 of the aircraft, which extends along the longitudinal direction L. The circumferential direction U and the longitudinal direction L extend transversely to one another. The frame structure 2 can be composed of a single profiled support or by a plurality of profiled support segments adjoining one another in the circumferential direction. The frame structure 2 can have a Z-shaped or similar cross section, for example.

The frame structure 2 has a first connecting section 21 and a second connecting section 22. The connecting sections 21, 22 are provided for securing the reinforcing structure 3 and each form one end of the frame structure 2 in relation to the circumferential direction U. In particular, the first and the second connecting sections 21, 22 are arranged spaced apart from one another along the circumferential direction U. As can be seen particularly in FIG. 3, the connecting sections 21, 22 of the frame structure 2 thereby delimit an opening or interruption O in the frame structure 2.

Figure 4:
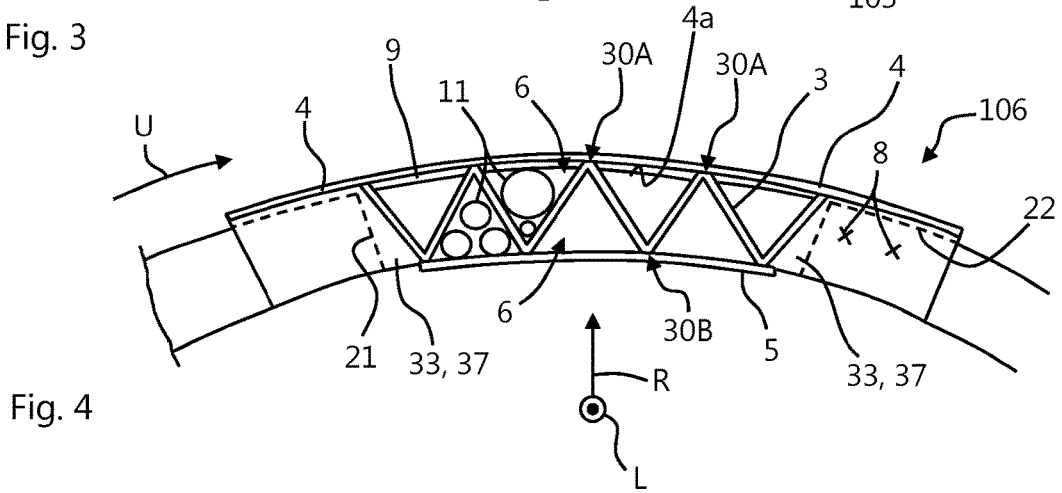
FIG. 4 shows a truncated section through a fuselage structure according to one illustrative embodiment of the present invention.
Figure 5:
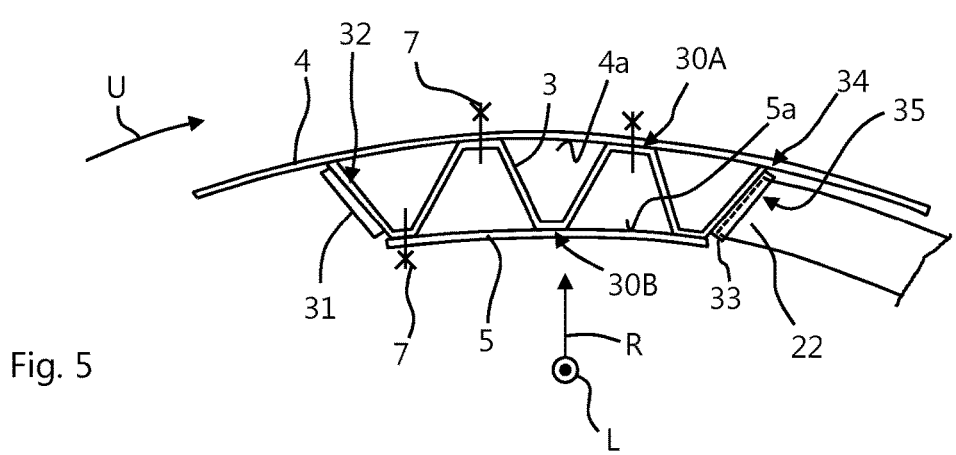
FIG. 5 shows a truncated section through a fuselage structure according to another illustrative embodiment of the present invention.

As can be seen especially in FIGS. 4 and 5, which each show a truncated section through the fuselage structure 1, the reinforcing structure 3 is arranged between the outer shell 4 and the inner shell 5 in relation to a radial direction R, which extends transversely to the circumferential direction U and transversely to the longitudinal direction L.

The outer and the inner shell 4, 5 are each implemented as components extending in a sheet-like manner along the longitudinal direction L and along the circumferential direction U, in particular as curved plates extending along one another. The shells 4, 5 are each optionally formed from a fibre composite material.

The reinforcing structure 3 is implemented as a layer or ply which extends in a sheet-like manner in the longitudinal direction L and the circumferential direction U and has a profiled cross section when viewed in the longitudinal direction L. In particular, the reinforcing structure 3 can have a zigzag cross-sectional shape, in particular a cross-sectional shape which forms triangles, along the circumferential direction U, as illustrated by way of example in FIG. 4. FIG. 5 shows, by way of example, a cross-sectional shape forming a trapezium along the circumferential direction U. Of course, it is also possible for a cross-sectional shape which is sinusoidal, for instance, to be provided along the circumferential direction U. In particular, the reinforcing structure 3 can be formed from a fibre composite material. The reinforcing structure 3 and the shells 4, 5 are preferably formed from the same fibre composite material.

As illustrated especially in FIGS. 3 and 4, the reinforcing structure 3 is arranged between the outer and the inner shell 4, 5 in relation to the radial direction R. The outer shell 4 is thus arranged on an outer side 3A of the reinforcing structure 3 and, in particular, is secured thereon. The inner shell 5 is arranged, in particular secured, on an inner side 3B of the reinforcing structure 3, which is situated opposite the outer side 3A in relation to the radial direction R.

As shown in FIGS. 4 and 5, the profiled cross section of the reinforcing structure 3 means that, together with the inner shell 5 and the outer shell 4, it forms a plurality of channels 6, which are adjacent to one another in the circumferential direction U and each extend in the longitudinal direction L. In particular, the reinforcing structure 3 is profiled in such a way that it is connected alternately to the outer shell 4 and to the inner shell 5 along the circumferential direction U, as illustrated by way of example in FIGS. 4 and 5. In FIG. 4, this is achieved by profiling the reinforcing structure 3 in triangular form and, in FIG. 5, it is achieved by trapeziform profiling.

As an option, provision can furthermore be made for the reinforcing structure 3 to rest alternately against the outer shell 4 and the inner shell 5 along the circumferential direction U. In this case, the reinforcing structure 3 has a plurality of outer contact regions 30A, which are spaced apart in the circumferential direction U, extend in the longitudinal direction L and rest against and are connected to the outer shell 4. The reinforcing structure 3 furthermore has a plurality of inner contact regions 30B, which are spaced apart in the circumferential direction U, extend in the longitudinal direction L and rest against and are connected to the inner shell 5. As illustrated in FIGS. 4 and 5, the inner contact regions 30B and the outer contact regions 30A are arranged alternately along the circumferential direction U.

Figure 6:
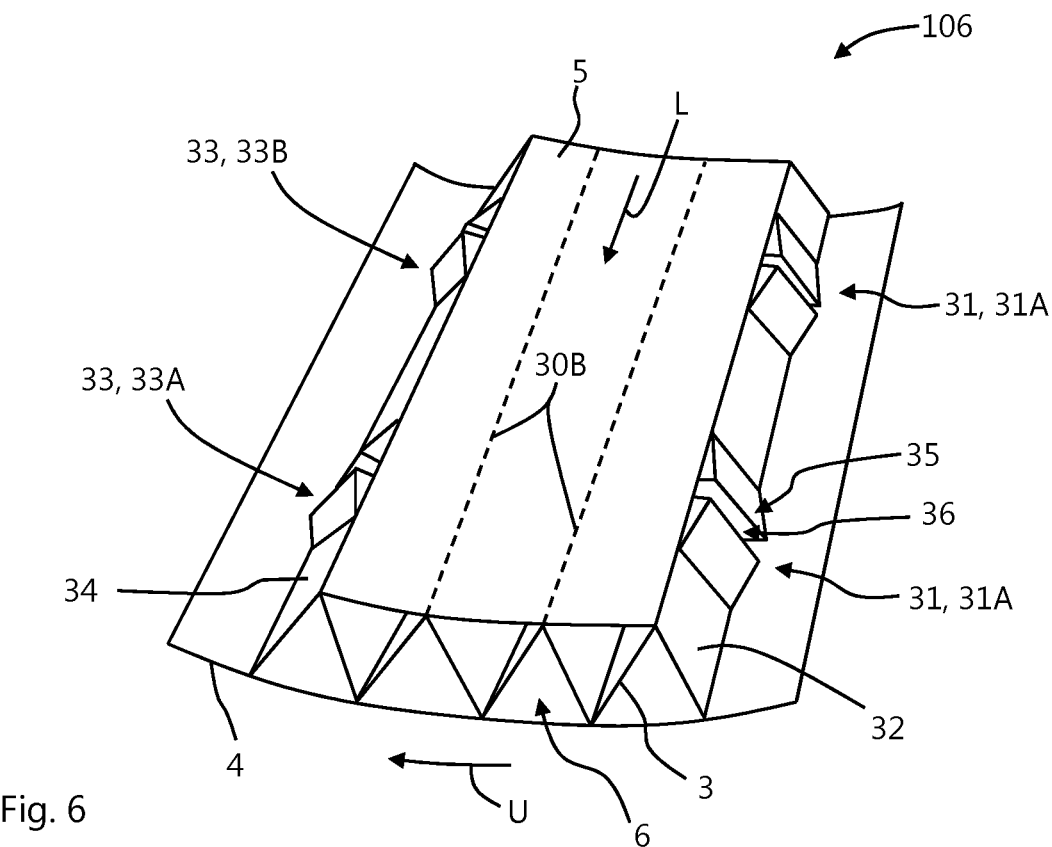
FIG. 6 shows a partial perspective view of a fuselage structure according to another illustrative embodiment of the present invention viewed in the direction of an inner shell of the fuselage structure.

The outer shell 4 and the inner shell 5 can each be connected materially to the reinforcing structure 3, e.g. by welding along the optional contact regions 30A, 30B, as illustrated symbolically in FIGS. 4 and 6. As an alternative or in addition, fastening devices 7 can be provided on the reinforcing structure 3 to secure the shells 4, 5, e.g. in the form of screws or rivets. This is illustrated schematically in FIG. 5.

As illustrated schematically in FIG. 4, the outer shell 4 can have an insulating layer 9, e.g. in the form of a mineral wool layer, on an inner surface 4a, which faces the reinforcing structure 3. As illustrated by way of example in FIG. 4, a section of the insulating layer 9 is provided in each case between two adjacent outer contact regions 30A, in which the reinforcing structure 3 rests against the inner surface 4a of the outer shell 4. As an option, an insulating layer (not illustrated) can also be provided on an inner surface 5a of the inner shell 5, said surface facing the reinforcing structure 3.

Figure 7:
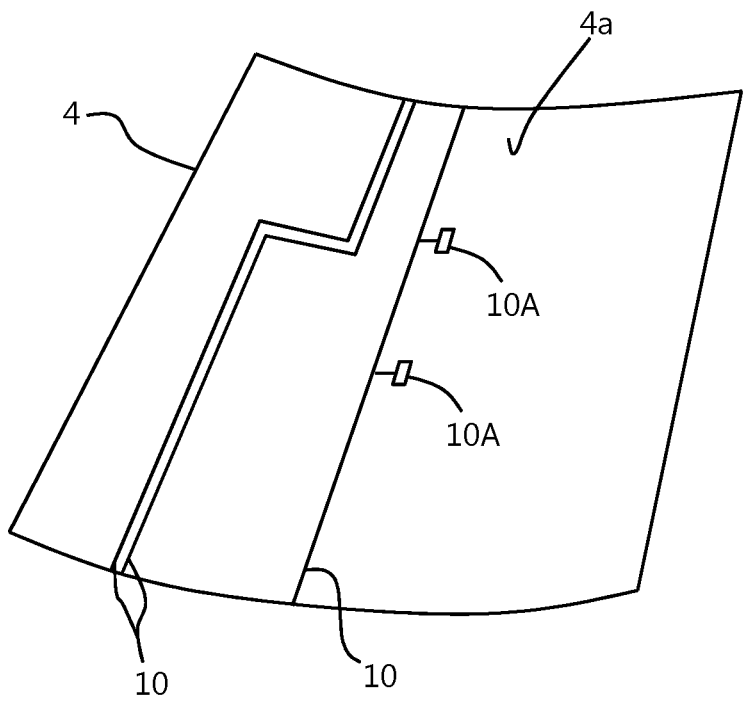
FIG. 7 shows a perspective view of an outer shell of a fuselage structure according to another illustrative embodiment of the present invention viewed in the direction of an inner surface of the outer shell.

As shown schematically and by way of example in FIG. 7, electric conductor tracks 10 can be formed on the inner surface 4a of the outer shell 4. As can be seen in FIG. 7, this enables electric components, e.g. sensors 10A, to be supplied in an extremely space-saving way. Of course, electric conductor tracks (not illustrated) can also be formed on the inner surface 5a of the inner shell 5.

Together with the inner shell 5 and the outer shell 4, the reinforcing structure 3 forms a fuselage panel 106.

As illustrated schematically in FIG. 2, the reinforcing structure 3 is inserted into the interruption O in the frame structure 2. In particular, the reinforcing structure 3 extends along the circumferential direction U between the first and the second connecting section 21, 22 of the frame structure 2. In the case of an optional further frame structure 20, the reinforcing structure 3 extends between the first and the further frame structure 2, 20. The reinforcing structure 3 is connected to the first and to the second connecting section 21, 22 of the frame structure 2.

To connect the reinforcing structure 3 to the connecting sections 21, 22 of the frame structure 2, the reinforcing structure 3 optionally has a first fastening structure 31 and a second fastening structure 33. These are illustrated schematically in FIGS. 4 and 5. FIG. 6 shows one possible configuration of the fastening structures 31, 33 in detail.

The first fastening structure 31 is arranged on a first end section 32 of the reinforcing structure 3 in relation to the circumferential direction U and is connected to the first connecting section 21 of the frame structure 2. The second fastening structure 33 is arranged on a second end section 34 of the reinforcing structure 3, which is situated opposite the first end section 32 in relation to the circumferential direction U and is connected to the second connecting section 21 of the frame structure 2.

As shown by way of example in FIGS. 3 and 4, the first fastening structure 31 and the second fastening structure 33 can each be formed by a profiled support 37, e.g. in the form of a plate, which extends in the circumferential direction U and projects from the reinforcing structure 3 along the circumferential direction U. The respective profiled support 37 is connected to the respective connecting section 21, 22 of the frame structure, e.g. materially and/or by means of fastening devices 8.

As illustrated schematically in FIG. 4, it is possible, in particular, to provide for the profiled support 37 which forms the first fastening structure 31 to overlap with the first connecting section 21 and for the profiled support 37 which forms the second fastening structure 33 to overlap with the second connecting section 22 in the circumferential direction U. FIG. 4 illustrates, by way of example, that the second connecting section 22 of the frame structure 2 is connected to the second fastening structure 33 by means of fastening devices 8, e.g. in the form of rivets.

As illustrated by way of example in FIG. 6, in particular, the first fastening structure 31 and the second fastening structure 33 can also be formed by a receiving recess 36 formed in a projection 35. In FIG. 6, by way of example, the projection 35 is formed by two spaced ramps, between which the receiving recess 36 extends. In FIG. 6, a front first fastening structure 31A for connection to the first connecting section 21 of the first frame structure 2 and a rear first fastening structure 31B, arranged spaced apart from the front first fastening structure 31A in the longitudinal direction L, for connection to the first connecting section 201 of the further frame structure 20 are provided. A front second fastening structure 33A for connection to the second connecting section 22 of the first frame structure 2 and a rear second fastening structure 33B, arranged spaced apart from the front second fastening structure 33A in the longitudinal direction L, for connection to the second connecting section 202 of the further frame structure 20 are furthermore provided in FIG. 6.

For connection to the frame structure 2, the respective connecting section 21, 22 of the frame structure 2 is accommodated in the receiving recess 36 of the respective fastening structure 31, 33, as illustrated by way of example in FIG. 5. In this case, it is possible, in particular, for there to be a material joint.

Figure 8:
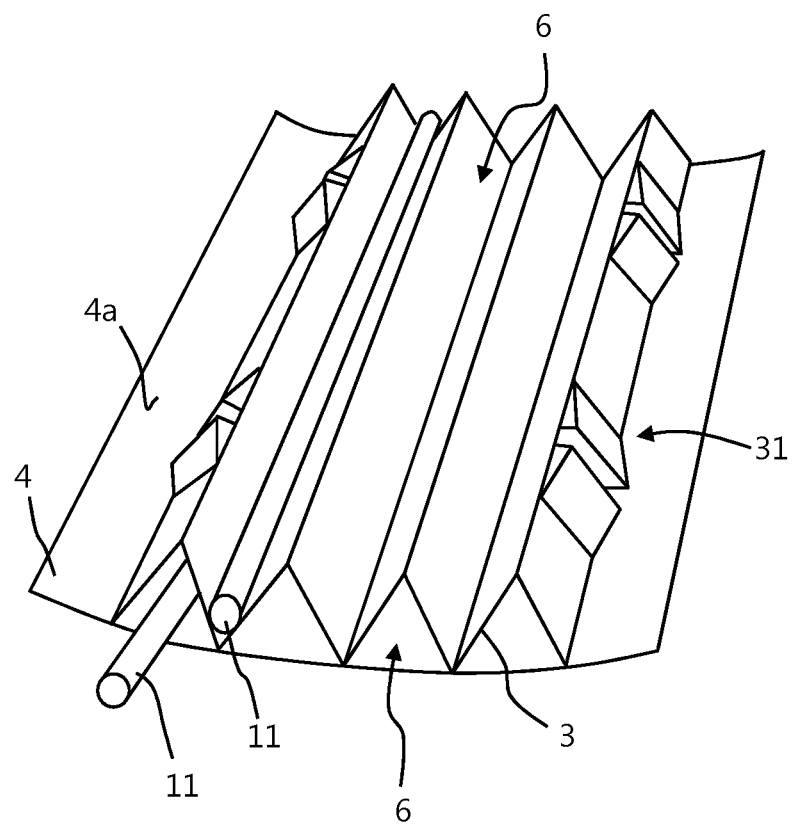
FIG. 8 shows a partial perspective view of a fuselage structure according to another illustrative embodiment of the present invention.

The fuselage panel 106 can be produced by first of all supplying or producing the outer shell 4, for example. As an option, the insulating layer 9 and the conductor tracks 10 can also be applied during this process, as illustrated by way of example in FIG. 7. The reinforcing structure 3 and the inner shell 5 are furthermore supplied or produced. The reinforcing structure 3 is connected to the inner and the outer shells 5, 4. For example, the reinforcing structure 3 can be placed on the inner surface 4a of the outer shell 4 and secured thereon, as illustrated by way of example in FIG. 8. The inner shell 5 can then be secured by means of the inner surface 5a thereof on the reinforcing structure 3, as illustrated in FIG. 6. As an option, functional components 11, such as pipes or the like, can be placed or inserted into the channel cross sections of the channels 6 defined by the profiled shape of the reinforcing structure 3 even before the attachment of the inner shell 5.

The fuselage panel 106 can be used as an upper shell of the aircraft 100, for example, as illustrated by way of example in FIGS. 1 to 3. In FIG. 1, by way of example, a multiplicity of fuselage panels 106 adjoining one another in the longitudinal direction L is provided. Of course, it is also possible to provide just a single fuselage panel 106, e.g. in the form of an upper shell. One advantage of the above-described construction of the fuselage structure 1 consists in that the frame structures 2, 20 can first of all be installed and connected to one another by stringers 203, for example, as illustrated schematically in FIG. 3. The fuselage panel 106 can then be inserted into the interruptions O in the frame structures 2, 20 from the outside in relation to the radial direction R.

By virtue of the profiled configuration of the reinforcing structure 3, it forms channels 6 together with the shells 4, 5. Functional components 11, in particular supply lines, can be arranged in said channels, as illustrated by way of example in FIGS. 4 and 8. These are therefore accommodated within the fuselage structure 1 in relation to the radial direction R and thus accommodated in an extremely space-saving manner. As can be seen in FIG. 2, it is thereby possible to achieve a large spacing in the radial direction R between a floor 205 extending along the longitudinal axis L100 and the fuselage panel 106 used as an upper shell in FIG. 2, and this is not compromised by the channels 6. Another advantage is that the fuselage 101 can initially be assembled without the upper shell 106. This enables the floor 205 to be held from above in a simple manner during assembly and enables the frame structure 2, 20 to be built up around the floor 205. Moreover, cabin components, e.g. seats or the like, can be passed into the interior of the fuselage through the opening O in the frame structure 2, 20.

The extent of the reinforcing layer 3 in the longitudinal direction L also ensures extended-area support of the outer shell 4, which, in particular, can form a part of the outer skin 105 of the aircraft 100.

Although the present invention has been explained above by way of example using embodiment examples, it is not restricted to these but can be modified in many different ways. In particular, combinations of the above embodiment examples are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 fuselage structure
2 frame structure
3 reinforcing structure
3A outer side of the reinforcing structure
3B inner side of the reinforcing structure
4 outer shell
4a inner surface of the outer shell
5 inner shell
5a inner surface of the inner shell
6 channels
7 fastening devices
8 fastening devices
9 insulating layer
10 conductor tracks
10A sensors
11 functional components
20 further frame structure
21 first connecting section
22 second connecting section
30A outer contact regions
30B inner contact regions
31 first fastening structure
31A front first fastening structure
32 first end section of the reinforcing structure
33 second fastening structure
34 second end section of the reinforcing structure
35 projection
36 receiving recess
100 aircraft
101 fuselage
102 wings
103 horizontal tail surfaces
104 tailplane
105 outer skin
106 fuselage panel
201 first connecting section of the further frame structure
202 second connecting section of the further frame structure
203 stringer
205 floor
O interruption in the frame structure
U circumferential direction
L longitudinal direction
L100 longitudinal axis of the aircraft

The invention claimed is:

1. A fuselage structure for an aircraft, comprising:
a first frame structure configured as a ring segment extending in a circumferential direction and having a first connecting section and a second connecting section arranged spaced apart from the first connecting section along the circumferential direction;
a reinforcing structure extending along the circumferential direction between the first and the second connecting section of the first frame structure and connected respectively to the first and the second connecting section, the first frame structure and the reinforcing structure together forming an O-shaped structure in a cross-sectional view;
an outer shell secured on an outer side of the reinforcing structure; and
an inner shell secured on an inner side of the reinforcing structure, said inner side being situated opposite the outer side,
wherein only the reinforcing structure has a profiled cross section when viewed in a longitudinal direction extending transversely to the circumferential direction and the reinforcing structure together with the inner shell and the outer shell, forms a plurality of channels, which are adjacent to one another in the circumferential direction and each extending in the longitudinal direction.

2. The fuselage structure according to claim 1, wherein the reinforcing structure is profiled in such a way that the reinforcing structure is connected alternately to the outer shell and to the inner shell along the circumferential direction.

3. The fuselage structure according to claim 1, wherein the outer shell, the inner shell and the reinforcing structure are each formed from a fibre composite material.

4. The fuselage structure according to claim 3, wherein the outer shell, the inner shell and the reinforcing structure are each formed from the same fibre composite material.

5. The fuselage structure according to claim 1, wherein the outer shell and the inner shell are each connected materially and/or by fastening devices to the reinforcing structure.

6. The fuselage structure according to claim 1, wherein the reinforcing structure has a first fastening structure connected to the first connecting section of the first frame structure, and a second fastening structure connected to the second connecting section of the first frame structure.

7. The fuselage structure according to claim 6, wherein the first fastening structure and/or the second fastening structure are/is formed by a receiving recess formed in a projection and in which the respective connecting section of the first frame structure is accommodated.

8. The fuselage structure according to claim 6, wherein the first fastening structure and/or the second fastening structure are/is formed by a profiled support extending in the circumferential direction and connected to the respective connecting section of the first frame structure.

9. The fuselage structure according to claim 8, wherein the profiled support overlaps with the respective connecting section of the first frame structure in the circumferential direction.

10. The fuselage structure according to claim 1, wherein the connecting sections of the first frame structure are each connected to the reinforcing structure materially and/or by fastening devices.

11. The fuselage structure according to claim 1, wherein the outer shell has an insulating layer on an inner surface facing the reinforcing structure.

12. The fuselage structure according to claim 1, wherein electric conductor tracks are formed on an inner surface of the outer shell facing the reinforcing structure, and/or on an inner surface of the inner shell facing the reinforcing structure.

13. The fuselage structure according to claim 1, wherein functional components are arranged in the channels.

14. The fuselage structure according to claim 1, further comprising:
a second frame structure spaced apart from the first frame structure in the longitudinal direction and having a first connecting section and a second connecting section arranged spaced apart from the first connecting section along the circumferential direction, wherein the reinforcing structure extends along the circumferential direction between the first and the second connecting section of the second frame structure and is connected respectively to the first and the second connecting sections of the second frame structure.

15. An aircraft comprising a fuselage structure according to claim 1.

* * * * *